(12) United States Patent
Isobe et al.

(10) Patent No.: US 7,649,666 B2
(45) Date of Patent: Jan. 19, 2010

(54) COMPONENTS AND METHODS FOR USE IN ELECTRO-OPTIC DISPLAYS

(75) Inventors: Norifusa Isobe, Bedford, MA (US); Steven Joseph Battista, Dorchester, MA (US); Erika D. A. Hanna, Somerville, MA (US)

(73) Assignee: E Ink Corporation, Cambridge, MA (US)

(*) Notice: Subject to any disclaimer, the term of this patent is extended or adjusted under 35 U.S.C. 154(b) by 0 days.

(21) Appl. No.: 11/951,489

(22) Filed: Dec. 6, 2007

(65) Prior Publication Data

US 2008/0137176 A1    Jun. 12, 2008

Related U.S. Application Data

(60) Provisional application No. 60/868,973, filed on Dec. 7, 2006.

(51) Int. Cl.
   *G02F 1/03* (2006.01)
(52) U.S. Cl. ..................................... 359/245
(58) Field of Classification Search ............ 359/245
   See application file for complete search history.

(56) References Cited

U.S. PATENT DOCUMENTS

| | | | |
|---|---|---|---|
| 3,668,106 A | 6/1972 | Ota | |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 4,418,346 A | 11/1983 | Batchelder | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |

(Continued)

FOREIGN PATENT DOCUMENTS

EP    1 099 207 B1    3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—Jordan M. Schwartz
*Assistant Examiner*—James C Jones
(74) *Attorney, Agent, or Firm*—David J. Cole (57) ABSTRACT

An electro-optic display (102), or a sub-assembly of such a display, comprising a layer of electro-optic material (108) on a backplane (100) is assembled using at least one release sheet (112, 116) or masking film having a resistivity not greater than about $10^{13}$ Ω square. The use of such a release sheet or masking film helps to avoid damage to transistors in the backplane during the assembly process.

11 Claims, 6 Drawing Sheets

U.S. PATENT DOCUMENTS

| | | | |
|---|---|---|---|
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,759 B2 | 10/2006 | Zehner et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 | 2/2007 | Doshi et al. | |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,223,672 B2 | 5/2007 | Kazlas et al. | |
| 7,230,750 B2 | 6/2007 | Whitesides et al. | |
| 7,230,751 B2 | 6/2007 | Whitesides et al. | |
| 7,236,290 B1 | 6/2007 | Zhang et al. | |
| 7,236,291 B2 | 6/2007 | Kaga et al. | |
| 7,236,292 B2 | 6/2007 | LeCain et al. | |
| 7,242,513 B2 | 7/2007 | Albert et al. | |
| 7,247,379 B2 | 7/2007 | Pullen et al. | |
| 7,256,766 B2 | 8/2007 | Albert et al. | |
| 7,259,744 B2 | 8/2007 | Arango et al. | |
| 7,280,094 B2 | 10/2007 | Albert | |
| 7,304,634 B2 | 12/2007 | Albert et al. | |
| 7,304,787 B2 | 12/2007 | Whitesides et al. | |
| 7,312,784 B2 | 12/2007 | Baucom et al. | |
| 7,312,794 B2 | 12/2007 | Zehner et al. | |

| | | |
|---|---|---|
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 2002/0006492 A1* | 1/2002 | Morikawa et al. .......... 428/40.1 |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0027327 A1* | 2/2004 | LeCain et al. ................ 345/107 |
| 2004/0104121 A1 | 6/2004 | Kaneko et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0048416 A1 | 3/2005 | Osawa |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0124751 A1 | 6/2005 | Klingenberg et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1* | 7/2007 | Danner et al. ................ 359/296 |
| 2007/0200795 A1 | 8/2007 | Whitesides et al. |
| 2007/0200874 A1 | 8/2007 | Amundson et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 | 10/2007 | Sohn et al. |
| 2007/0285385 A1 | 12/2007 | Albert et al. |
| 2007/0286975 A1* | 12/2007 | Fazel et al. ................. 428/41.8 |
| 2008/0013155 A1 | 1/2008 | Honeyman et al. |
| 2008/0013156 A1 | 1/2008 | Whitesides et al. |
| 2008/0023332 A1 | 1/2008 | Webber et al. |
| 2008/0024429 A1 | 1/2008 | Zehner |
| 2008/0024482 A1 | 1/2008 | Gates et al. |
| 2008/0030832 A1 | 2/2008 | Paolini, Jr. et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0057252 A1 | 3/2008 | Danner et al. |
| 2008/0074730 A1 | 3/2008 | Cao et al. |
| 2008/0117495 A1 | 5/2008 | Arango et al. |
| 2008/0129667 A1 | 6/2008 | Zehner et al. |
| 2008/0136774 A1 | 6/2008 | Harris et al. |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

COMPONENTS AND METHODS FOR USE IN ELECTRO-OPTIC DISPLAYS

REFERENCE TO RELATED APPLICATIONS

This application claims benefit of copending Application Ser. No. 60/868,973, filed Dec. 7, 2006.

This application is related to:
(a) application Ser. No. 10/249,957, filed May 22, 2003 (now U.S. Pat. No. 6,982,178), which claims benefit of Application Ser. No. 60/319,300, filed Jun. 10, 2002, and Application Ser. No. 60/320,186, filed May 12, 2003;
(b) application Ser. No. 10/907,065, filed Mar. 18, 2005 (now U.S. Pat. No. 7,236,292), which is a divisional of the aforementioned application Ser. No. 10/249,957;
(c) copending application Ser. No. 10/605,024, filed Sep. 2, 2003 (Publication No. 2004/0155857);
(d) application Ser. No. 10/904,063, filed Oct. 21, 2004 (now U.S. Pat. No. 7,110,164), which is a continuation-in-part of the aforementioned application Ser. No. 10/605,024.
(e) copending application Ser. No. 11/550,114, filed Oct. 17, 2006 (Publication No. 2007/0109219);
(f) copending application Ser. No. 11/612,732, filed Dec. 19, 2006 (Publication No. 2007/0152956);
(g) copending application Ser. No. 11/682,409, filed Mar. 6, 2007 (Publication No. 2007/0211331); and
(h) copending application Ser. No. 11/561,536, filed Nov. 20, 2006 (Publication No. 2007/0153361).

The entire contents of these copending applications, and of all other U.S. patents and published and copending applications mentioned below, are herein incorporated by reference.

BACKGROUND OF INVENTION

This invention relates to components and methods for use in electro-optic displays. More specifically, this invention relates to such components and methods in which a release sheet (a term which is used herein in a broad sense to mean any sheet which is peeled from a sub-assembly during manufacture of an electro-optic display, and thus includes materials sometimes referred to as "masking films") having a relatively high conductivity is used. This invention primarily relates to such components and methods containing an electro-optic medium which is a solid (such displays may hereinafter for convenience be referred to as"solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870, 657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,220; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,290; and 7,236,292; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0213191; 2005/0219184; 2005/0253777; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0202949; 2006/0223282; 2006/0232531; 2006/0245038; 2006/0256425; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0097489; 2007/0109219; 2007/0128352; and 2007/0146310; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

Other types of electro-optic media, for example encapsulated liquid crystal media, may also be used in the components and methods of the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

As discussed in the aforementioned U.S. Pat. No. 6,312,304, the manufacture of solid electro-optic displays also presents problems in that the optical components (the electro-optic medium) and the electronic components (in the backplane) have differing performance criteria. For example, it is desirable for the optical components to optimize reflectivity, contrast ratio and response time, while it is desirable for the electronic components to optimize conductivity, voltage-current relationship, and capacitance, or to possess memory, logic, or other higher-order electronic device capabilities. Therefore, a process for manufacturing an optical component may not be ideal for manufacturing an electronic component, and vice versa. For example, a process for manufacturing an electronic component can involve processing under high temperatures. The processing temperature can be in the range from about 300° C. to about 600° C. Subjecting many optical components to such high temperatures, however, can be harmful to the optical components by degrading the electro-optic medium chemically or by causing mechanical damage.

This U.S. Pat. No. 6,312,304 describes a method of manufacturing an electro-optic display comprising providing a modulating layer including a first substrate and an electro-optic material provided adjacent the first substrate, the modulating layer being capable of changing a visual state upon application of an electric field; providing a pixel layer comprising a second substrate, a plurality of pixel electrodes provided on a front surface of the second substrate and a plurality of contact pads provided on a rear surface of the second substrate, each pixel electrode being connected to a contact pad through a via extending through the second substrate; providing a circuit layer including a third substrate and at least one circuit element; and laminating the modulating layer, the pixel layer, and the circuit layer to form the electro-optic display.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electrophoretic displays are essentially batch methods in which the electro-optic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including a particle-based electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally viewed through the electrically-conductive layer and adjacent substrate (if present). The substrate will be typically be a polymeric film, and will normally have a thickness in the range of about 1 to about 25 mil (25 to 634 μm), preferably about 2 to about 10 mil (51 to 254 μm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

Electro-optic displays manufactured using the aforementioned front plane laminates or double release films normally have a layer of lamination adhesive between the electro-optic layer itself and the backplane, and the presence of this lamination adhesive layer affects the electro-optic characteristics of the displays. In particular, the electrical conductivity of the lamination adhesive layer affects both the low temperature performance and the resolution of the display. The low temperature performance of the display can (it has been found empirically) be improved by increasing the conductivity of the lamination adhesive layer, for example by doping the layer with tetrabutylammonium hexafluorophosphate or other materials as described in the aforementioned U.S. Pat. No. 7,012,735 and Publication No. 20050122565. However, increasing the conductivity of the lamination adhesive layer in this manner tends to increase pixel blooming (a phenomenon whereby the area of the electro-optic layer which changes optical state in response to change of voltage at a pixel electrode is larger than the pixel electrode itself), and this blooming tends to reduce the resolution of the display. Hence, this type of display apparently intrinsically requires a compromise between low temperature performance and display resolution, and in practice it is usually the low temperature performance which is sacrificed.

The aforementioned 2007/0109219 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned 2007/0109219 describes various methods designed for high volume manufacture of electro-optic displays using inverted front plane laminates; preferred forms of these methods are "multi-up" methods designed to allow lamination of components for a plurality of electro-optic displays at one time.

In practice, it has been found that the methods described above, using front plane laminates, inverted front plane laminates and double release films, can sometimes result in damage to the transistors or other non-linear devices typically present in the backplane of the electro-optic display. Such damage can cause pixels of the display to cease to switch between their various optical states, or to switch more slowly or incompletely. Such damage is of course highly undesirable since it adversely affects the quality of images written on the display.

It has now been discovered (although this information is not available in the published literature) that one major cause of damage to transistors or other non-linear devices in display backplanes is discharge through the backplane of electrostatic charges generated during peeling of a release sheet from a sub-assembly used to form the display. It has also been discovered that such damage can be avoided, or at least greatly reduced, if the conductivity of the release sheet is within an appropriate range. Accordingly, the present invention relates to components comprising such release sheets for use in the manufacture of electro-optic displays, and to methods for the use of such components.

SUMMARY OF THE INVENTION

The present invention provides a sub-assembly useful in the manufacture of an electro-optic display, the sub-assembly comprising a layer of an electro-optic material and a release sheet capable of being peeled from the sub-assembly, the release sheet having a resistivity not greater than about $10^{13}\Omega$ square. Typically, the resistivity of the release sheet will be not greater than about $10^{12}\Omega$ square, and not less than about $10^{2}\Omega$ square.

The sub-assembly of the present invention may further comprise a backplane comprising at least one electrode, the backplane being disposed on the opposed side of the layer of electro-optic material from the release sheet. In addition, the sub-assembly may comprise a front substrate disposed between the layer of electro-optic material and the release sheet.

The sub-assembly of the present invention may be in the form of a front plane laminate comprising, in order: a light-transmissive electrically-conductive layer; the layer of an electro-optic material, this layer being of a solid electro-optic material and being in electrical contact with the electrically-conductive layer; an adhesive layer; and the release sheet. Alternatively, the sub-assembly may be in the form of a double release sheet comprising the layer of an electro-optic material, this layer being of a solid electro-optic material and sandwiched between two adhesive layers, one or both of the adhesive layers being covered by a release sheet. The sub-assembly may also be in the form of a double release sheet comprising the layer of an electro-optic material, this layer being of a solid electro-optic material and sandwiched between two release sheets. The sub-assembly may also be in the form of an inverted front plane laminate comprising, in order: at least one of a light-transmissive protective layer and a light-transmissive electrically-conductive layer; an adhesive layer; the layer of an electro-optic material, this layer being of a solid electro-optic material; and the release sheet.

The sub-assembly of the present invention may make use of any of the various types of electro-optic media discussed above. Thus, in this sub-assembly, the electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined within a plurality of capsules or microcells, or may be present as a plurality of discrete droplets surrounded by a continuous phase comprising a polymeric material. The fluid may be liquid or gaseous.

This invention also provides a method for assembling a layer of an electro-optic material on a backplane, the method comprising: providing a sub-assembly comprising a layer of an electro-optic material and a release sheet capable of being peeled from the sub-assembly, the release sheet having a resistivity not greater than about $10^{13}\Omega$ square; providing a backplane comprising at least one electrode and at least one non-linear device connected to the electrode; peeling the release sheet from the layer of electro-optic material; and laminating the layer of electro-optic material to the backplane.

In this method, the sub-assembly may comprise an adhesive layer disposed between the layer of electro-optic material and the release sheet, so that after the removal of the release sheet the adhesive layer is contacted with the backplane. The sub-assembly may further comprise, on the opposed side of the layer of electro-optic material from the release sheet and in order, a front substrate, a second adhesive layer and a second release sheet, the second release sheet having a resistivity not greater than about $10^{13}\Omega$ square, the method further comprising peeling the second release sheet from the second adhesive layer and contacting the second adhesive layer with a second sub-assembly comprising at least one of a barrier layer and a hard coat, thereby securing the at least one of a barrier layer and a hard coat to the front substrate by means of the second adhesive layer. The second sub-assembly may comprise a third release sheet having a resistivity not greater than about $10^{13}\Omega$ square, and the method may further comprise peeling the third release sheet from the second sub-assembly prior to contacting the second adhesive layer with the second sub-assembly.

As discussed in more detail below, it has been found that damage to transistors or similar non-linear devices in a backplane is especially likely where an electro-optic layer is already present on a backplane and an additional layer is to be secured to the opposed side of the electro-optic layer from the backplane. In these circumstances, if a release sheet is removed either from the backplane/electro-optic layer sub-assembly or from the additional layer so as to generate electrostatic charge on either the sub-assembly or the additional layer, damage to non-linear devices on the backplane is likely. Accordingly, in such a process, it is highly desirable that any release sheet peeled from the sub-assembly or the additional layer have a resistivity not greater than about $10^{13}\Omega$ square.

DETAILED DESCRIPTION

As already mentioned, the present invention relates to sub-assemblies and methods for use in the manufacture of electro-optic displays. To avoid damage to transistors or other non-linear devices present in the backplane of the display, at least one release film used in the sub-assembly or method of the present invention has a resistivity not greater than about $10^{13}\Omega$ square. All resistivities quoted herein are measured after the relevant material has been stored at 25° C. and 50 percent relative humidity for a period such that the resistivity of the material becomes stable.

Although the release film used in the sub-assembly or method of the present invention has a resistivity up to about $10^{13}\Omega$ square, it is generally preferred that the resistivity of the release film not exceed about $10^{12}\Omega$ square. As shown empirically below, release films having such a resistivity do produce significant reductions in the electrostatic charge generated during peeling of the release film.

The sub-assembly of the present invention may be any sub-assembly comprising a layer of an electro-optic material and a release sheet useful in the manufacture of an electro-optic display. Thus, the sub-assembly may be a front plane laminate, double release film or inverted front plane laminate of any of the types described above. However, the sub-assembly can also take other forms. In particular, the "sub-assembly" of the present invention may comprise an electro-optic display which is itself complete and functional but which is designed to have further layers added, for example for increased protection against environmental contaminants, radiation etc.

Figure 1A:
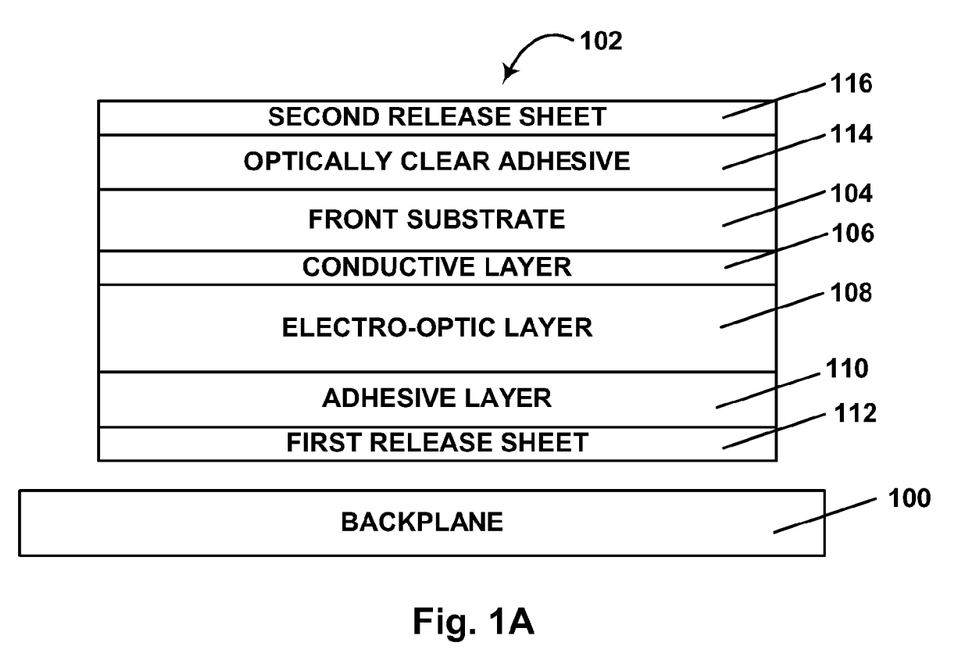
FIGS. 1A to 1D are schematic side elevations showing various stages in the assembly of an electro-optic display by the method of the present invention.

FIGS. 1A-1D of the accompanying drawings illustrate a process for the manufacture of an electro-optic display using a sub-assembly of this type. FIGS. 1A-1D are not to scale; the illustrated thicknesses of the various layers do not necessarily correspond to their actual thicknesses, and in all cases the thicknesses of the layers are greatly exaggerated relative to their lateral dimensions. FIG. 1A illustrates a backplane (generally designated 100) comprising pixel electrodes, thin film transistors and associated circuitry, all of which are omitted from FIGS. 1A-1D for the sake of clarity. Disposed adjacent the backplane 100 is a front plane laminate (generally designated 102) of the type described in the aforementioned U.S. Pat. No. 6,982,178 and comprising a substantially transparent front substrate 104 (in the form of a poly(ethylene terephthalate) (PET) film), a substantially transparent electrically-conductive layer 106 (in the form of a thin layer of indium tin oxide, ITO), a layer of electro-optic material 108, a lamination adhesive layer 110 and a first release sheet 112, all of which are as described in the patent. However, for reasons explained below, the front plane laminate 102 further comprises a layer of optically clear adhesive 114, on the opposed side of the front substrate 104 from the conductive layer 106, and a second release sheet 116 covering the optically clear adhesive 114.

Figure 1B:
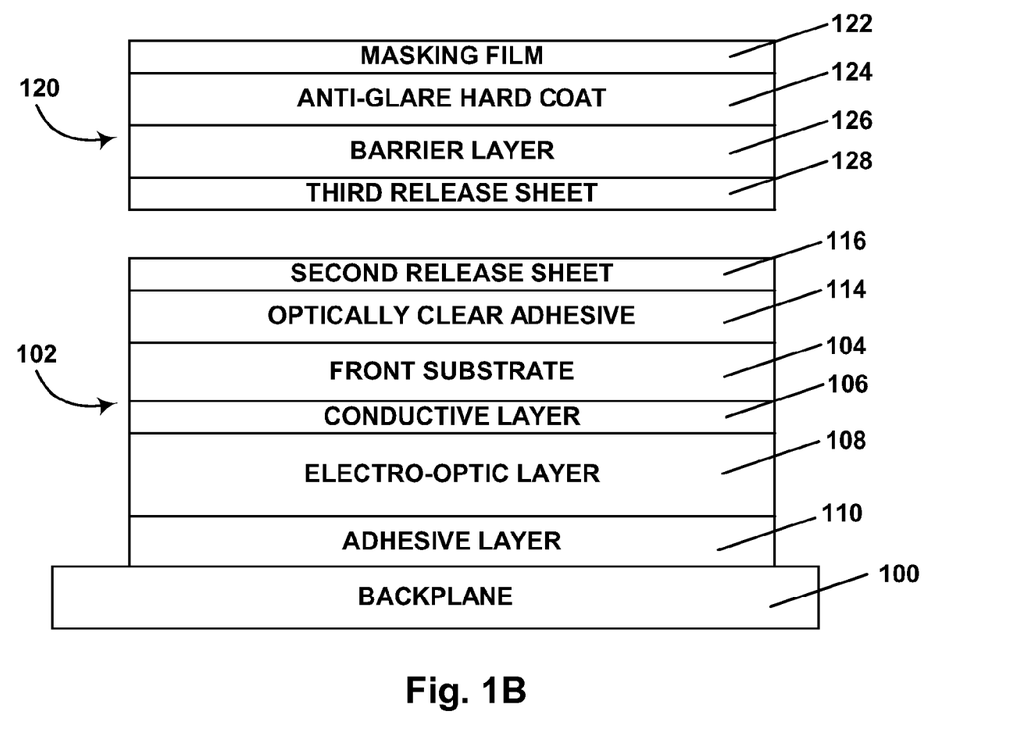
Figure 1C:
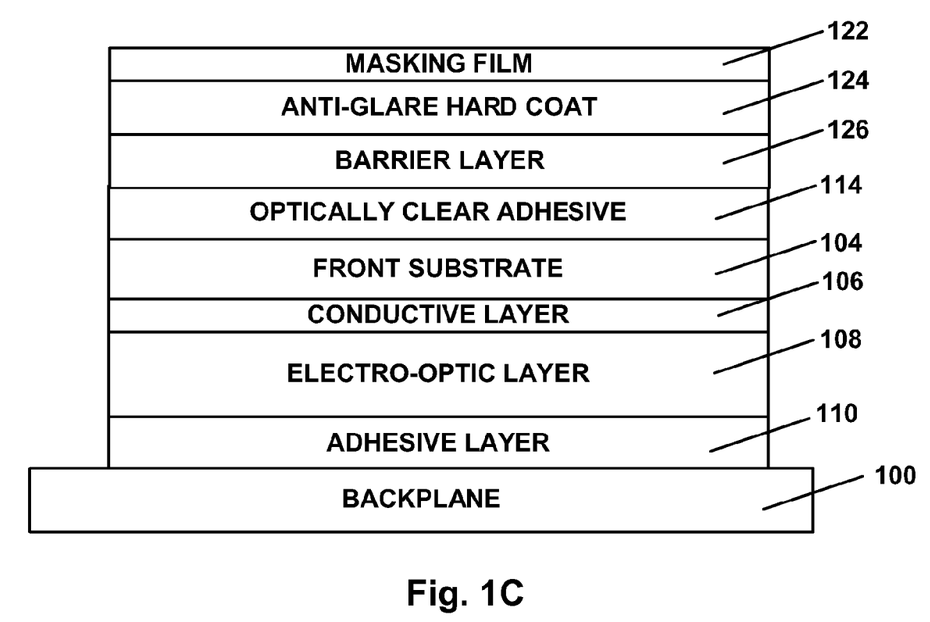

In the first step of the process for forming an electro-optic display, the first release sheet 112 is peeled from the front plane laminate 102 and the remaining layers of the front plane laminate are laminated to the backplane 100 under heat and pressure, as described in the aforementioned U.S. Pat. No. 6,982,178, to produce the structure shown in FIG. 1B. To prevent damage to the backplane 100 during this step, the first release sheet has a resistivity not greater than about $10^{12}\Omega$ square. The removal of the release sheet 112 can result in the development of a substantial electrostatic charge on the remaining layers of the front plane laminate 102 and this electrostatic charge could discharge through and damage the transistors in the backplane. However, using a release sheet having a resistivity not greater than about $10^{12}\Omega$ square keeps the electrostatic charge low enough to ensure that peeling of the release sheet does not damage the transistors on the backplane. Although not shown in FIG. 1B, the front plane laminate 102 is provided with a conductive via which connects the conductive layer 106 to a connection provided on the backplane 100. Accordingly, the structure shown in FIG. 1B is in fact a fully functional electro-optic display. However, for reasons discussed in several of the aforementioned E Ink and MIT patents and applications, it is desirable to provide additional protection for the display against ingress of oxygen, moisture, radiation and other potential problem materials into the electro-optic layer itself, and the further steps described below provide such additional protection.

As also illustrated in FIG. 1B, the next step of the process uses a protective sheet (generally designated 120) which comprises, in order, a masking film 122, an anti-glare hard coat 124, a barrier layer 126 and a third release sheet 128. The barrier layer 126, which is designed to prevent penetration of moisture and ultra-violet radiation into the final display, is itself typically a complex multi-layer structure, but details of its internal construction are irrelevant to the present invention and will not be described herein. As shown in FIG. 1B, the protective sheet 120 is disposed adjacent the structure formed from the front plane laminate and the backplane, with the third release sheet 128 of the protective sheet 120 facing the second release sheet 116.

In the next step of the process, the second release sheet 116 is peeled from the adhesive 114 and the third release sheet 128 is peeled from the barrier layer 126. Either of these peeling operations could result in the generation of electrostatic charge sufficient to damage the transistors of the backplane 100, and accordingly both the second and third release sheets have resistivities not greater than about $10^{12}\Omega$ square. (Although any charge generated by peeling of the third release sheet 128 will of course reside only on the protective sheet 120, this charge can discharge through and damage the backplane when the protective sheet 120 is affixed to the backplane as described below.) The protective sheet is then laminated, typically under heat and pressure, to the adhesive 114, thus producing the structure shown in FIG. 1C.

Figure 1D:
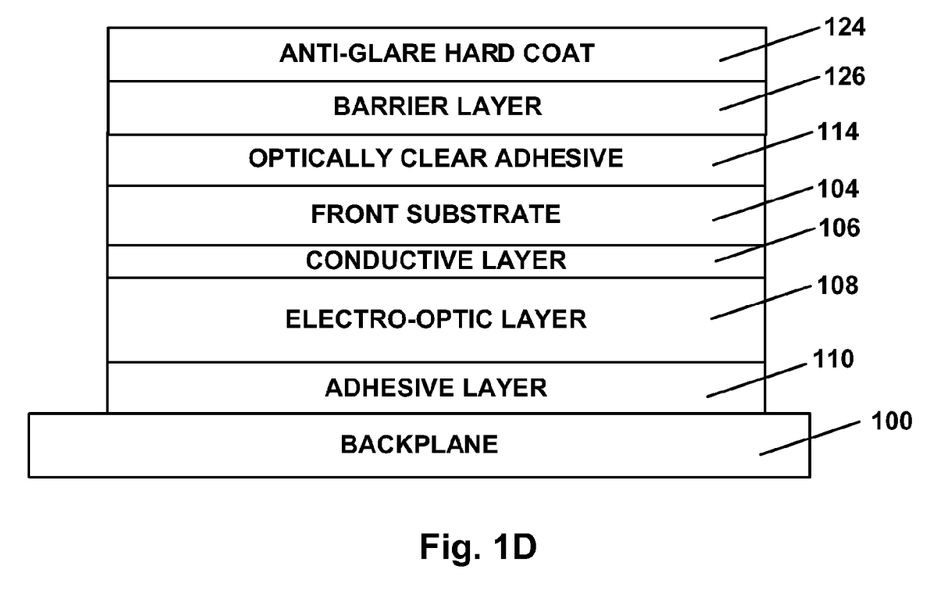

At this point the electro-optic display is essentially complete and the only remaining step is peeling of the masking film 122 from the hard coat 124 to produce the final structure shown in FIG. 1D. The time when this is done may vary with the application of the display. In some cases, removal of the masking film is effected when the display is incorporated into a chassis (for example the chassis of an electronic book reader, the chassis comprising a casing and electronics needed for driving the display, and other associated circuitry, for example solid state memory for storing books to be displayed); in other cases, the masking film 122 could be removed by the final customer, so that the masking film can serve to prevent damage to the hard coat 124 during delivery of the display. Regardless of the exact point at which the masking film 122 is removed to provide the final display structure shown in FIG. 1D, peeling of the masking film could result in the generation of electrostatic charge sufficient to damage the transistors of the backplane 100, and accordingly the masking film 122 has a resistivity not greater than about $10^{12}\Omega$ square.

In many cases, release sheets or masking films having resistivities suitable for use in the present invention will be available commercially. However, in some cases it may be difficult to find a commercial material having a suitable resistivity and all the other properties which may be required in a release sheet or masking film used in the present invention. In such circumstances, it will typically be necessary to select a film having all the desirable properties except the desired resistivity and then to adjust the resistivity to the desired value. Such resistivity adjustment can be effected in several different ways. For example, a surface active agent may be coated on to the film. Such a surface active agent may absorb moisture from the air, thus neutralizing and reducing surface electrical charge. Alternatively, a material of appropriate resistivity may be coated on to the release sheet, or incorporated therein. In the common case where a release sheet comprises a base (typically polymeric) layer and an adhesive layer, it may often be more convenient to incorporate the surface active agent or the material of appropriate conductivity into the adhesive layer rather than the base layer.

Those familiar with the problems caused by electrostatic discharges during manufacturing processes will be aware of techniques which have been used to reduce such problems in other industries, including the use of high humidity environments and so-called "ion blowers" which blow a stream of air containing ions on to any area where it is desired to avoid charge build-up. Neither approach appears to give good results when dealing with the problems caused by peeling release sheets or masking films during the production of electro-optic displays. Many types of electro-optic media are sensitive to moisture (i.e., the electro-optic properties of the material are affected by moisture) so that using a high humidity environment may cause undesirable changes in the electro-optic medium itself. In addition, there are obvious problems in ensuring a high humidity environment throughout large scale, multi-stage production of electro-optic displays in a factory setting. Although ion blowers can reduce electrostatic charges, they typically act too slowly to be convenient for use when release sheets are peeled; leaving the sub-assembly from which the release sheet has been peeled exposed for the period of (say) 30 or more seconds necessary for an ion blower to remove the substantial charge generated by peeling is at least awkward in a manufacturing environment, especially since some of the thin sub-assemblies involved may move around in the air flow from the ion blower. Accordingly, use of relatively conductive release sheets in accordance with the present invention is the preferred approach.

The following experimental results are given, though by way of illustration only, to show that the use of relatively conductive release sheets in accordance with the present invention is effective in reducing static discharge during the manufacture of electro-optic displays.

Experimental Tests

Figure 2:
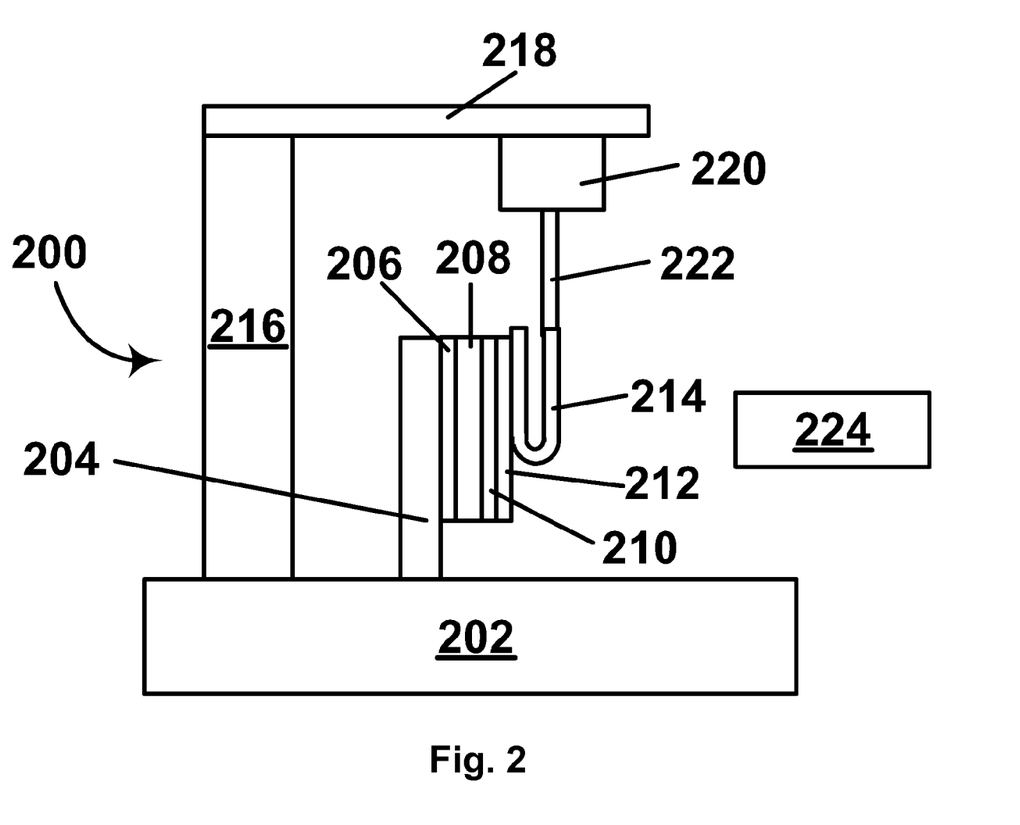
FIG. 2 is a schematic side elevation of a testing apparatus used in the experimental tests described below.

FIG. 2 of the accompanying drawings is a schematic side elevation of an experimental apparatus (generally designated 200) used in these experiments. The apparatus 200 comprises a base 202 from which extends upwardly an aluminum plate 204. One surface of the upper portion of plate 204 is covered by a double-sided adhesive tape 206, to which is adhered a glass plate 208. The surface of glass plate 208 remote from the tape 206 is covered by a second double-sided adhesive tape 210, to which is adhered a protective sheet 212, of the type shown in FIG. 1B. The protective sheet 212 is itself covered by a masking film 214.

The apparatus 200 further comprises a vertical bar 216 extending upwardly from the base 202 substantially parallel to the plate 204. The upper end of bar 216 carries a horizontal member 218, which carries, at its end remote from the bar 216, a descending member 220. The descending member 220 carries a clamping member 222, in which is clamped the lower end of masking film 214. The horizontal member 218, together with the associated descending member 220 and clamping member 222, can be moved vertically by an electric motor (not shown) at a constant velocity relative to the base 202, so that the masking film 214 is peeled at a constant rate from the underlying protective sheet 212. The apparatus is provided with means for measuring the force necessary to peel the masking film from the protective sheet. This peeling causes the development of electrostatic charges on both the protective sheet 212 and the masking film 214 and these charges are measured by a meter 224.

Combinations of three different commercial protective sheets (PS) and two different masking films (MF) were tested using the apparatus 200. One masking film, designated simply "PET" below, was a simple PET film having no anti-electrostatic coating and a resistivity greater than $10^{14}\Omega$ square. The second masking film, designated "PET/AES" below, was a similar PET film but provided with an anti-electrostatic coating and had a resistivity of about $10^{12}\Omega$ square. The meter used was a SIMCO Model FMV-003 ESD meter, and the peeling speed was 25 mm/second. The results are shown in Table 1 below. All measurements in this series of experiments, and the later series summarized in Table 2 below, were taken at 23° C. and 43 percent relative humidity. The rows labeled "|Δ|" show the absolute value of the difference between the voltages measured on the protective sheet and masking film in each test; it is this absolute voltage difference which is the best predictor of possible harmful current flows through the backplane which can damage thin film transistors.

TABLE 1

| | | Protective sheet | | | |
|---|---|---|---|---|---|
| | | A | A | B | C |
| | | | Masking film | | |
| | | PET | PET/AES | PET/AES | PET |
| Surface voltage at peel midpoint, kV | MF | −12.5 | +0.24 | +0.08 | −10.8 |
| | PS | 0 | −0.53 | −0.15 | +0.03 |
| |Δ| | | 12.5 | 0.77 | 0.23 | 10.83 |
| Surface voltage at peel endpoint, kV | MF | −10 | +0.08 | +0.45 | −7 |
| | PS | +0.15 | −0.60 | −0.10 | +0.11 |
| |Δ| | | 10.15 | 0.68 | 0.55 | 7.11 |
| Peel force, Kg | | 1.13 | 0.34 | 0.09 | 0.95 |

From the data in Table 1, it will be seen that the presence of the anti-electrostatic coating on the masking film reduced the voltage differences developed during peeling by about an order of magnitude; in neither case did the voltage difference obtained with the PET/AES films useful in the present invention exceed 1 kV. The presence of the anti-electrostatic coating on the masking film also significantly reduced the peeling force required.

A further series of experiments were conducted to determine whether the rate of peeling significantly affected the surface voltages and the peeling force. For this purpose, the experiment with Protective Sheet A and Masking Film PET was repeated using peel speeds of 2.1, 6.4. 13 and 25 mm/second. The results are shown in Table 2 below. Also, the results for the surface voltage on the masking film at the midpoint of the peel are plotted in FIG. 3 of the accompanying drawings, and the results for the peeling force are plotted in FIG. 4.

TABLE 2

| | | Peel speed mm/sec. | | | |
|---|---|---|---|---|---|
| | | 2.1 | 6.4 | 13 | 25 |
| Surface voltage at peel midpoint, kV | MF | −6.1 | −7.1 | −10.2 | −12.5 |
| | PS | −0.09 | +0.01 | +0.03 | 0 |
| |Δ| | | 6.01 | 7.11 | 10.23 | 12.5 |
| Surface voltage at peel endpoint, kV | MF | −6 | −8 | −8 | −10 |
| | PS | +0.08 | +0.1 | +0.06 | +0.15 |
| |Δ| | | 6.08 | 8.1 | 8.06 | 10.15 |
| Peel force, Kg | | 0.2 | 0.43 | 0.74 | 1.13 |

Figure 3:
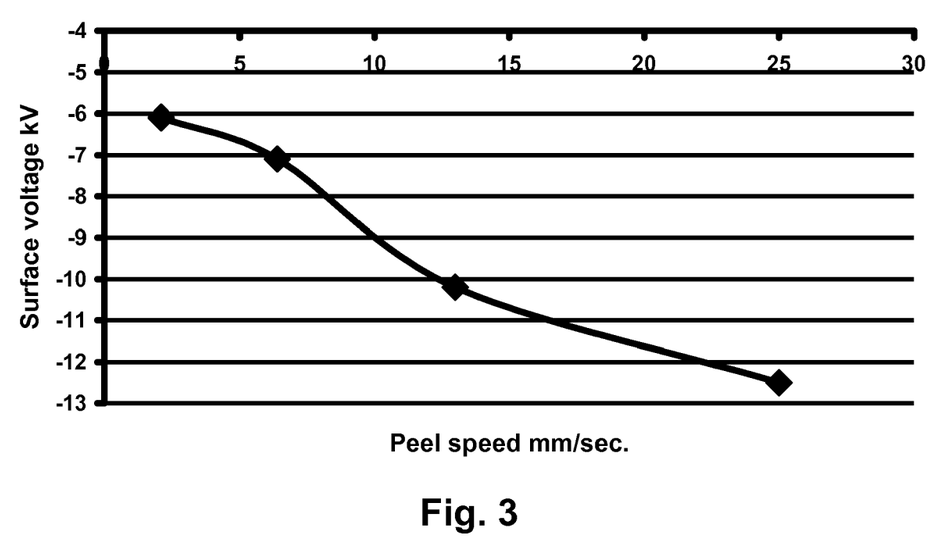
FIGS. 3 and 4 show respectively the variation of surface voltage and peel force with peel speed in experimental tests carried out using the apparatus of FIG. 2, as described below.
Figure 4:
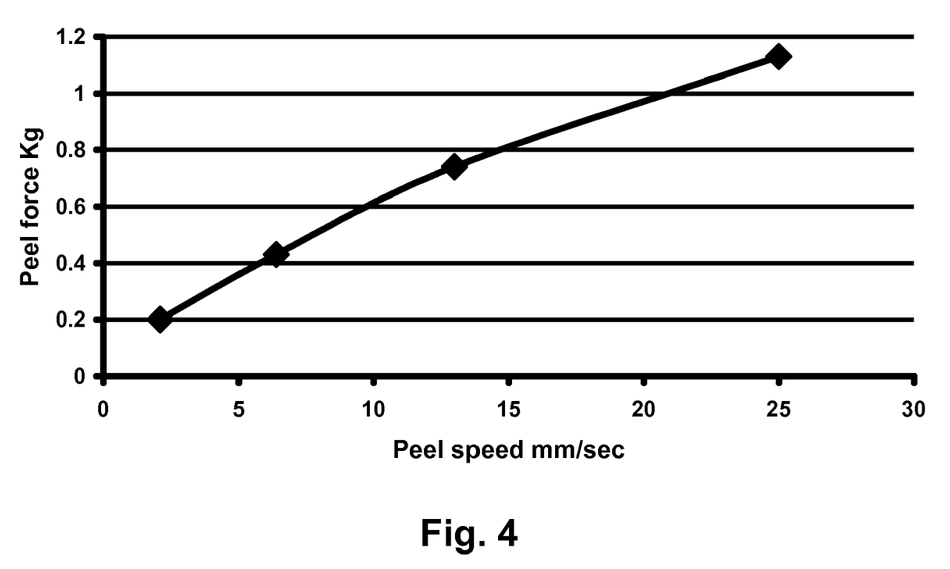

From the data in Table 2, and from FIGS. 3 and 4, it will be seen that the magnitude of both the surface voltage on the masking film and the peel force increase rapidly with peel speed. Hence, the importance of provisions for charge dissipation increases when high peel speeds are likely, for example where large displays are being manufactured, or at high production rates.

In a further series of experiments, various combinations of protective sheet and masking film were peeled from each other at a constant peeling force of 0.15 Kg; this resulted in different peeling speeds in the various tests. The results obtained are shown in Table 3 below and FIG. 5 plots the voltage difference between the masking film and the protective sheet measured at the peeling midpoint against the resistivity of the masking film; note that both axes in FIG. 5 are plotted logarithmically.

TABLE 3

| | | Protective sheet | | | | | |
|---|---|---|---|---|---|---|---|
| | | A | A | B | A | A | A |
| | | Masking film resistivity, ohm | | | | | |
| | | $2^{14}$ | $1^{12}$ | $3^{10}$ | $3^{14}$ | $3^{15}$ | $8^{9}$ |
| Surface voltage at peel midpoint, kV | MF | −5.7 | 0.18 | 0.12 | −16 | −22 | 0.82 |
| | PS | −0.08 | −0.37 | −0.22 | 0.85 | 1.10 | −0.24 |
| |Δ| | | 5.62 | 0.55 | 0.34 | 16.85 | 23.1 | 1.06 |
| Surface voltage at peel endpoint, kV | MF | −5.5 | 0.10 | 0.31 | −14 | −20 | 0.66 |
| | PS | 0.08 | −0.49 | −0.20 | 0.70 | 1.10 | 0.42 |
| |Δ| | | 5.58 | 0.59 | 0.51 | 14.7 | 21.1 | 0.24 |

Figure 5:
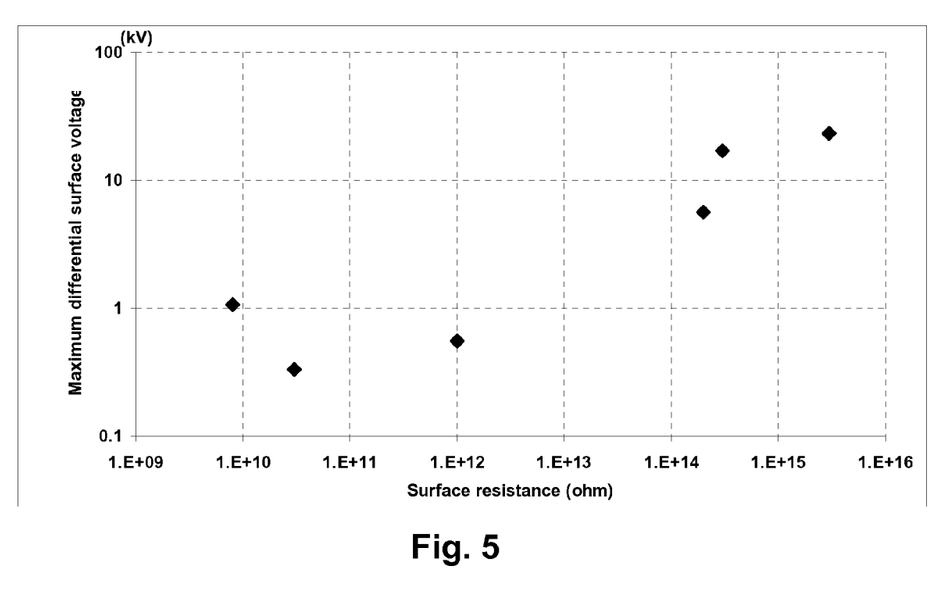
FIG. 5 shows the variation of surface voltage with masking film resistivity in experimental tests carried out using the apparatus of FIG. 2, as described below.

From Table 3 and FIG. 5, it will be seen that the surface voltage at the peel midpoint correlated very strongly with the resistivity of the masking film; the masking films having resistivities of $10^{14}$ ohm or more produced voltage differences of the order of 10 kV, whereas the masking films having resistivities of $10^{12}$ ohm or less produced voltage differences not greater than about 1 kV. As may be seen from Table 3, exactly the same tendency is apparent in the data from the peel endpoints.

It will be apparent from the preceding discussion that the sub-assemblies and methods of the present invention can make use of any electro-optic layer which has solid external surfaces to which adhesive layers and/or release sheets can adhere and sufficient mechanical cohesion to permit the necessary manipulation of films containing the electro-optic layer. Accordingly, the present methods can be carried out using any of the types of electro-optic media described above. For example, the present methods can make use of rotating bichromal member, electrochromic or electrophoretic media, and in the last case the electrophoretic media may be of the encapsulated, polymer-dispersed or microcell types.

Numerous changes and modifications can be made in the preferred embodiments of the present invention already described without departing from the scope of the invention. Accordingly, the foregoing description is to be construed in an illustrative and not in a limitative sense.

The invention claimed is:

1. A process for producing a protected electro-optic display, the process comprising:
   providing a first sub-assembly comprising, in order, a backplane comprising at least one electrode and at least one non-linear device connected to the electrode; a layer of an electro-optic material; an electrically-conductive layer; a front substrate; an adhesive layer; and a release sheet having a resistivity not greater than about $10^{13}\Omega$ square;
   providing a second sub-assembly comprising at least one of a barrier layer and a hard coat;
   peeling the release sheet from the first sub-assembly and contacting the second sub-assembly with the adhesive layer of the first sub-assembly, thereby securing the two sub-assemblies together to form the protected electro-optic display.

2. A process according to claim 1 wherein the second sub-assembly comprises a second release sheet having a resistivity not greater than about $10^{13}\Omega$ square, and the process further comprises peeling the second release sheet from the second sub-assembly prior to contacting the second sub-assembly with the adhesive layer of the first sub-assembly.

3. A process according to claim 1 wherein the second sub-assembly comprises both a barrier layer and a hard coat, and the barrier layer is contacted with the adhesive layer of the first sub-assembly.

4. A process according to claim 3 wherein the second sub-assembly further comprises a masking film in contact with the hard coat, and the process further comprises removing the masking film after the two sub-assemblies have been secured together.

5. A process according to claim 1 wherein the resistivity of the release sheet is not greater than about $10^{12}\Omega$ square.

6. A process according to claim 5 wherein the resistivity of the release sheet is not less than about $10^{12}\Omega$ square.

7. A process according to claim 1 wherein the electro-optic material comprises a rotating bichromal member or electrochromic material.

8. A process according to claim 1 wherein the electro-optic material comprises an electrophoretic material comprising a plurality of electrically charged particles disposed in a fluid and capable of moving through the fluid under the influence of an electric field.

9. A process according to claim 8 wherein the electrically charged particles and the fluid are confined within a plurality of capsules or microcells.

10. A process according to claim 8 wherein the electrically charged particles and the fluid are present as a plurality of discrete droplets surrounded by a continuous phase comprising a polymeric material.

11. A process according to claim 8 wherein the fluid is gaseous.

\* \* \* \* \*